(No Model.)

9 Sheets—Sheet 1.

G. E. BRUSH.
MACHINE FOR POUNCING CROWNS OF HATS.

No. 562,509.

Patented June 23, 1896.

WITNESSES:

INVENTOR
Geo. E. Brush
BY
ATT'Y (No Model.)

9 Sheets—Sheet 2.

G. E. BRUSH.
MACHINE FOR POUNCING CROWNS OF HATS.

No. 562,509.

Patented June 23, 1896.

WITNESSES:

INVENTOR
Geo. E. Brush
BY ATTY (No Model.) 9 Sheets—Sheet 3.
G. E. BRUSH.
MACHINE FOR POUNCING CROWNS OF HATS.
No. 562,509. Patented June 23, 1896.
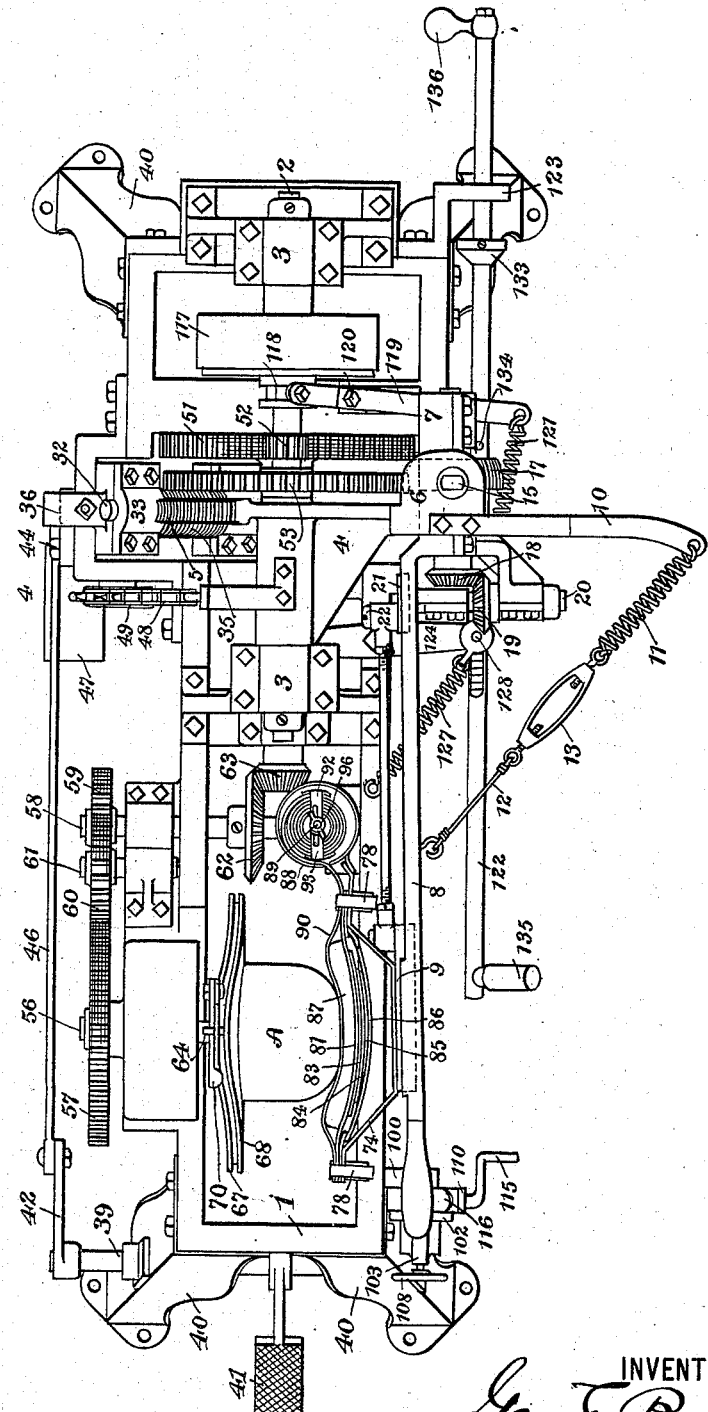
WITNESSES:
INVENTOR

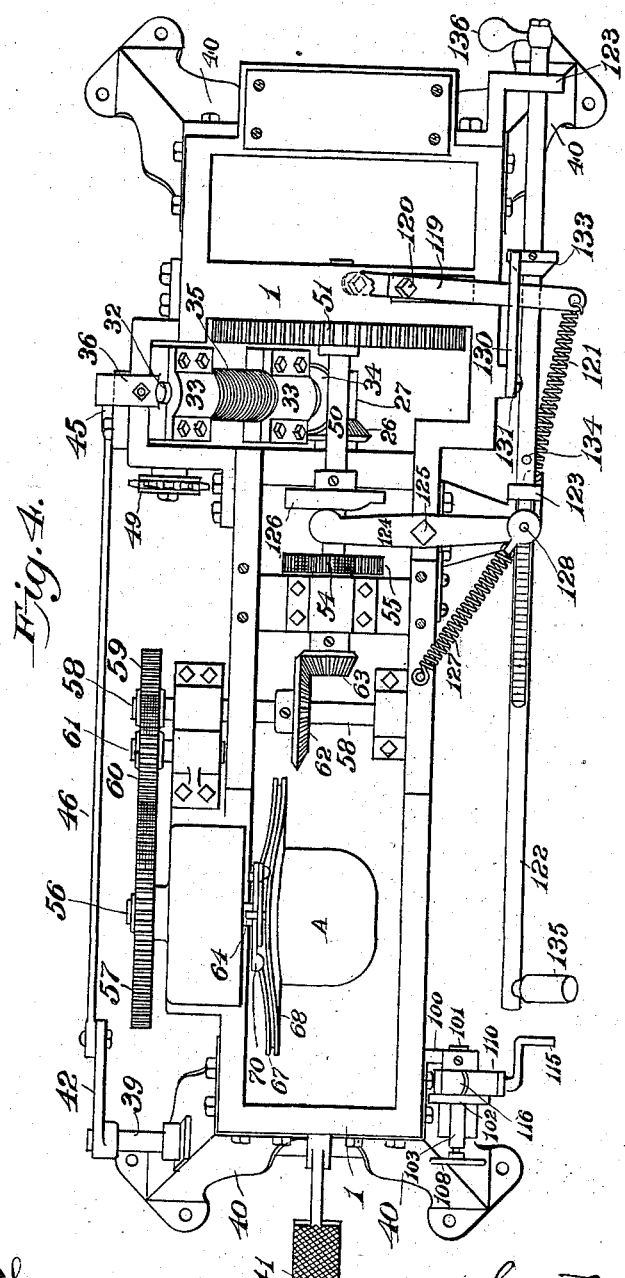

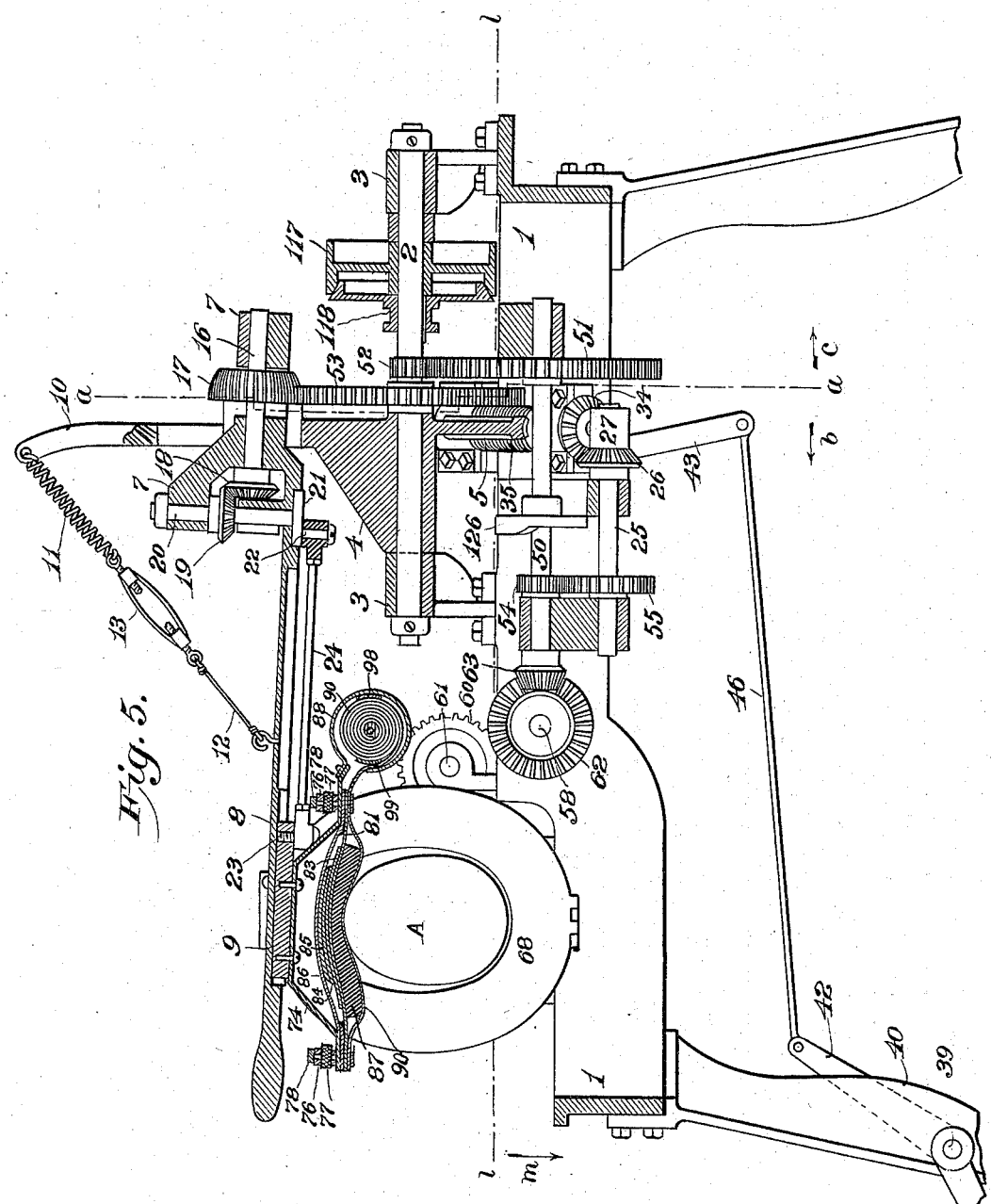

(No Model.) 9 Sheets—Sheet 6.
G. E. BRUSH.
MACHINE FOR POUNCING CROWNS OF HATS.
No. 562,509. Patented June 23, 1896.
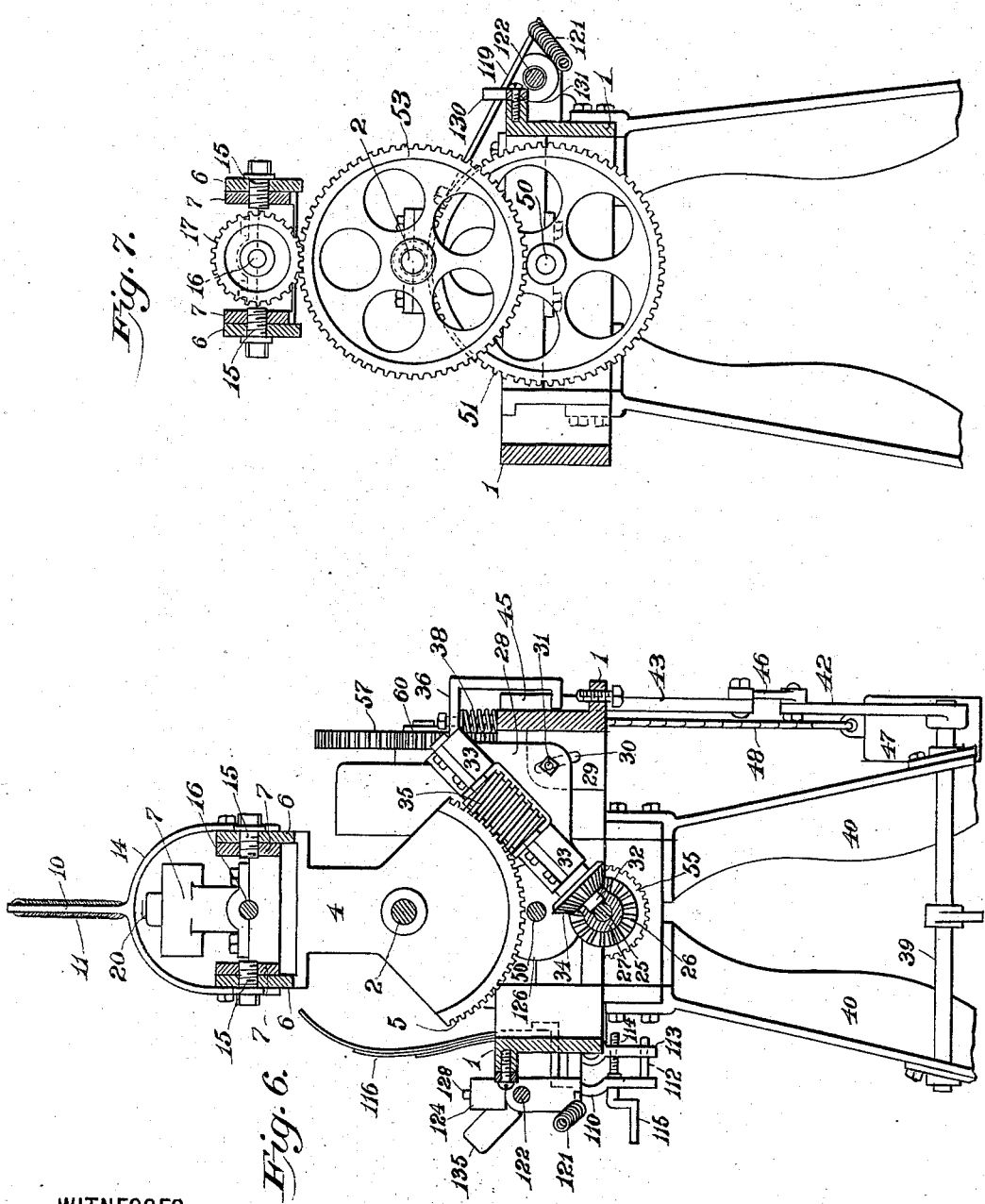
WITNESSES:
INVENTOR
Geo. E. Brush (No Model.) 9 Sheets—Sheet 7.
G. E. BRUSH.
MACHINE FOR POUNCING CROWNS OF HATS.
No. 562,509. Patented June 23, 1896.
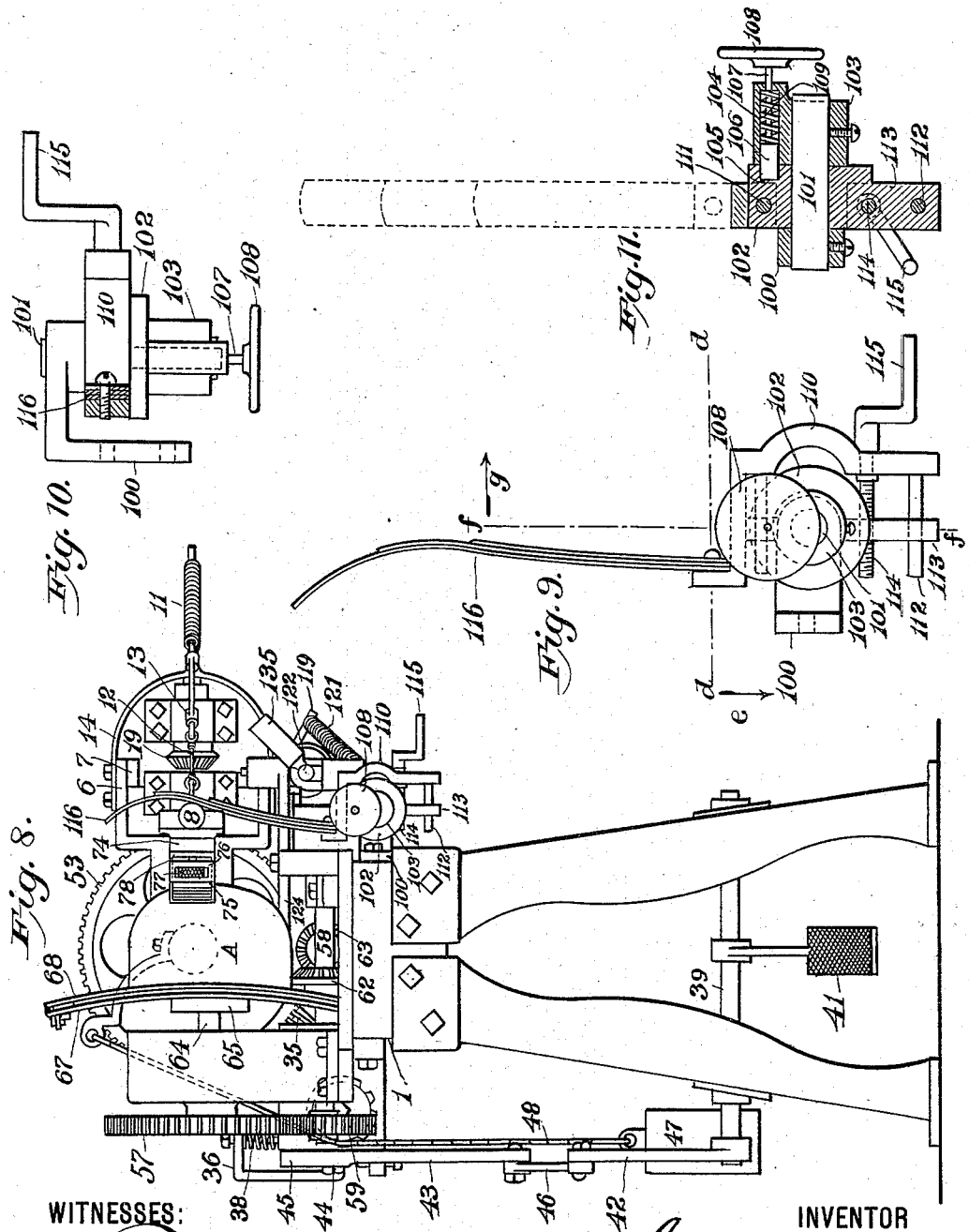
WITNESSES:
INVENTOR
Geo. E. Brush
BY ATTY (No Model.)  9 Sheets—Sheet 8.

G. E. BRUSH.
MACHINE FOR POUNCING CROWNS OF HATS.

No. 562,509. Patented June 23, 1896.

WITNESSES:  INVENTOR (No Model.) 9 Sheets—Sheet 9.
G. E. BRUSH.
MACHINE FOR POUNCING CROWNS OF HATS.
No. 562,509. Patented June 23, 1896.
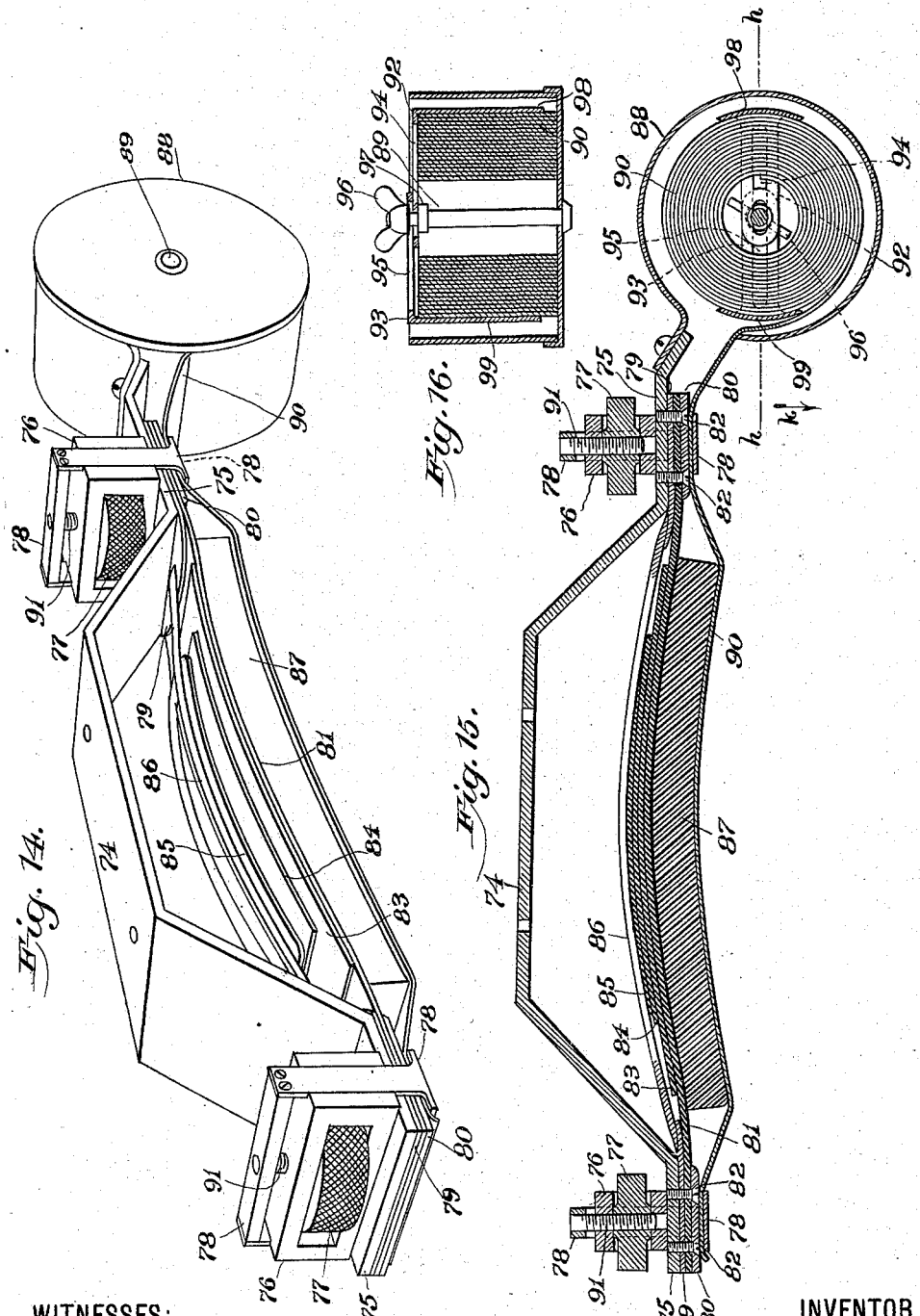
WITNESSES:
INVENTOR
Geo. E. Brush
BY ATTY

UNITED STATES PATENT OFFICE.

GEORGE E. BRUSH, OF DANBURY, CONNECTICUT.

MACHINE FOR POUNCING CROWNS OF HATS.

SPECIFICATION forming part of Letters Patent No. 562,509, dated June 23, 1896.

Application filed April 3, 1896. Serial No. 586,107. (No model.)

*To all whom it may concern:*

Be it known that I, GEORGE E. BRUSH, a citizen of the United States, residing at Danbury, in the county of Fairfield and State of Connecticut, have invented certain new and useful Improvements in Machines for Pouncing the Crowns of Hats; and I do hereby declare the following to be a full, clear, and exact description of the invention, such as will enable others skilled in the art to which it appertains to make and use the same.

My invention relates to certain new and useful improvements in machines for pouncing the crowns of hats, and has for its objects to uniformly pounce the area of a hat-crown, to provide a very simple and effective machine which shall be very readily controlled by the operator, to so arrange the sandpaper with respect to the pouncing-pad that a new piece of paper may be substituted for a worn piece with great facility, and to provide a pad which shall readily adapt itself to the contour of the hat, and which, while it always maintains a uniform pressure against the hat, shall be exceedingly flexible.

In order that those skilled in the art to which my invention appertains may more fully understand the nature and operation of the same, I will proceed to describe its construction in detail, referring by numerals and letters of reference to the accompanying drawings, which form a part of this application, and in which—

Figure 1:
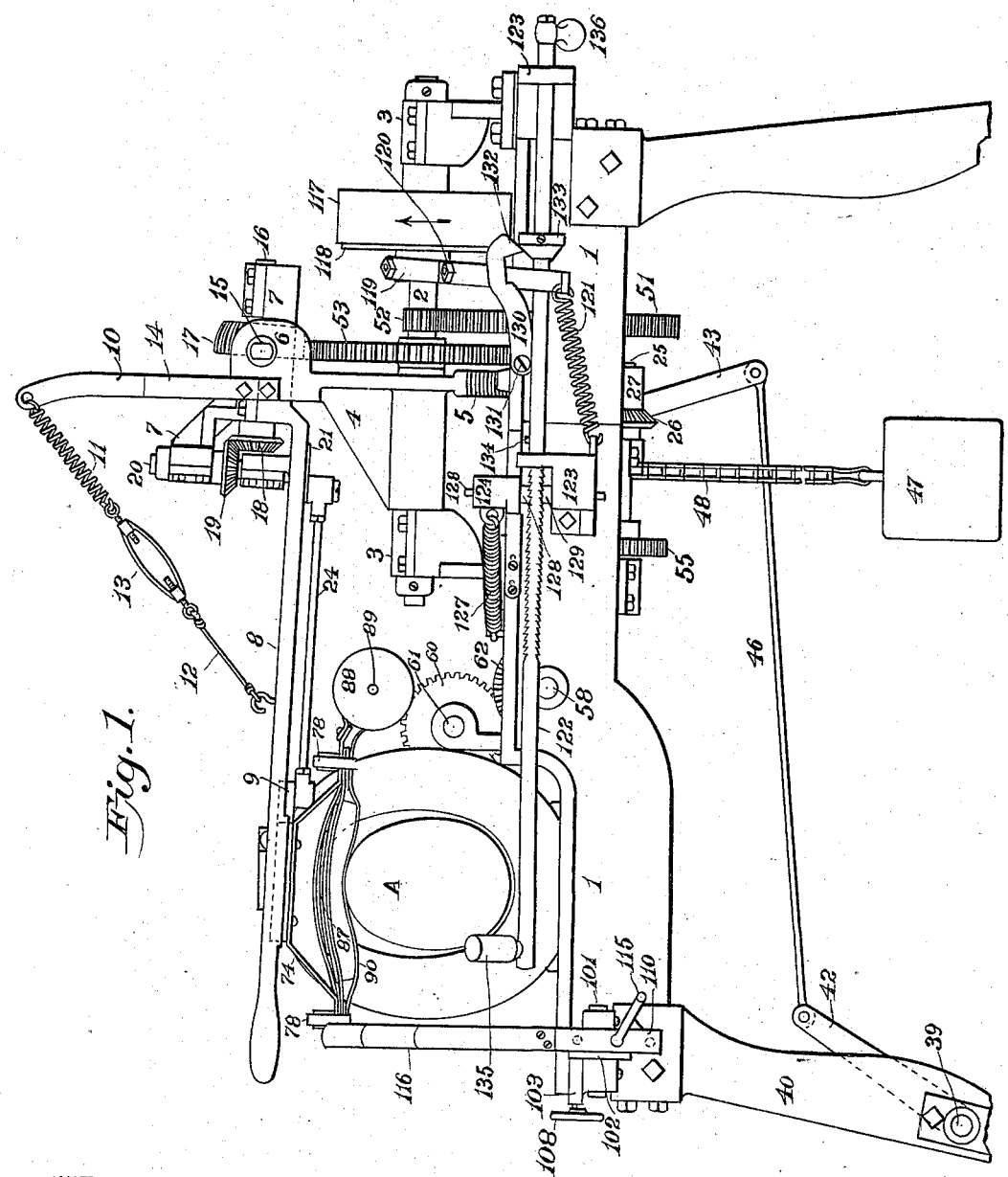
Figure 13:
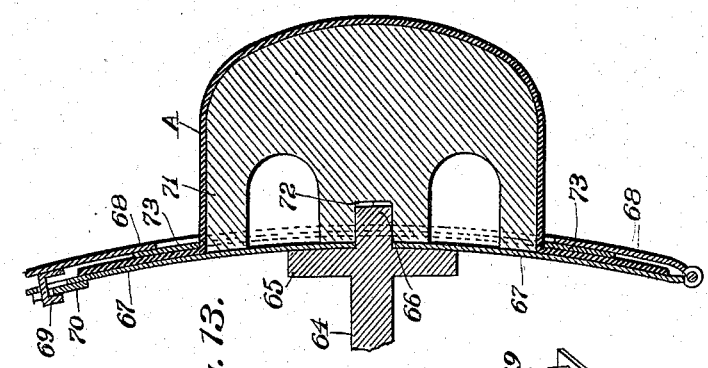
Figure 12:
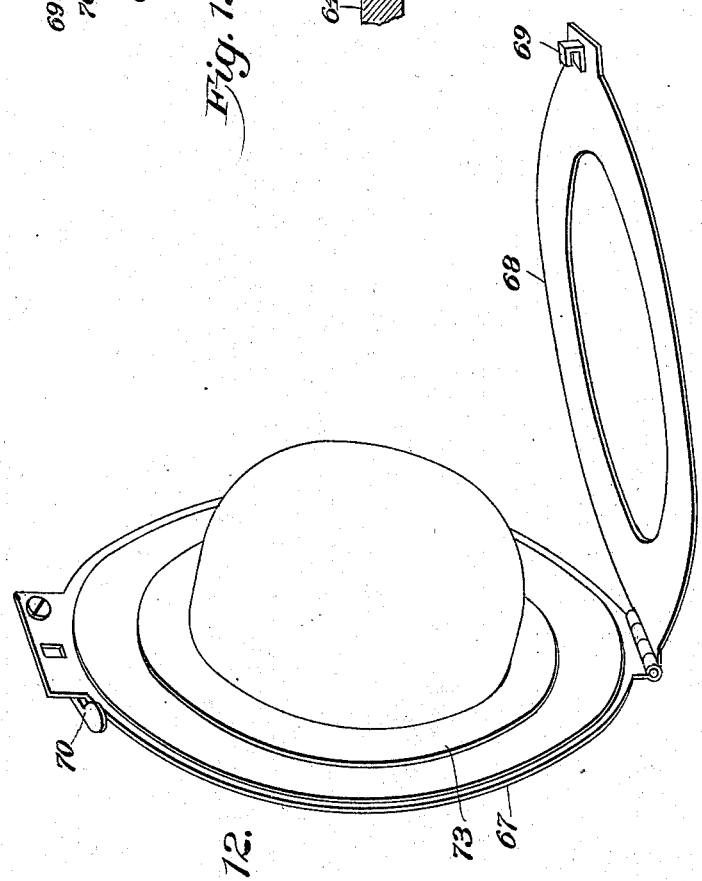

Figures 1 and 2 are elevations looking, respectively, at opposite sides of my improved machine; Fig. 3, a plan view showing the positions which the various parts assume when the pouncing-pad has been carried against the tip of the hat. Fig. 4 is also a plan view with the pouncing devices and the parts immediately supporting the same removed, this view being indicated as a section taken at the line 1 1 of Fig. 5. Fig. 5 is a central vertical longitudinal section of my machine; Fig. 6, a section at the line $a\ a$ of Fig. 5, looking in the direction of the arrow $b$; Fig. 7, a section at the line $a\ a$ of Fig. 5, looking in the direction of the arrow $c$; Fig. 8, an end elevation of my improved machine; Fig. 9, a detail elevation of the adjustable devices which hold the pad up to its work when operating against the tip of the hat; Fig. 10, a section at the line $d\ d$ of Fig. 9; Fig. 11, a section at the line $ff$ of Fig. 9. Fig. 12 is a detail perspective of the hat-clamping device; Fig. 13, a sectional elevation taken through the hat-clamping device and the shaft of the oval lathe and showing said shaft broken away and a hat properly clamped and ready for pouncing; Fig. 14, a detail perspective of my improved pad and sandpaper mechanism; Fig. 15, a longitudinal sectional elevation of the same, and Fig. 16 a detail cross-sectional elevation of the sandpaper-box and showing a sandpaper-roll properly secured therein.

Similar numbers and letters of reference denote like parts in the several figures of the drawings.

1 is the bed of the machine, and 2 the power-shaft, journaled within suitable bearings 3, rising from said bed. Loosely pivoted around this shaft is a rotary head 4, the lower portion of which is formed into a segment worm-gear 5, while the upper portion is forked so as to present brackets 6.

7 is a carriage from which extends the pouncing-arm 8, and 9 is a slide capable of reciprocating within suitable ways in said arm, which slide carries the pouncing-pad, as will be hereinafter explained.

10 is an arm whose upper extremity is connected with the pouncing-arm by means of the coil-spring 11, link 12, and adjusting-nut 13, the lower extremity of said arm being formed into a bail 14, which latter is bolted or otherwise secured to the outside of the brackets 6.

15 are screws driven through the brackets, the inner ends of which screws project and form pivotal points around which the carriage 7 is supported, so as to be capable of a free vibration.

It will be observed that the respective pivotal points of the head 4 and carriage 7 are in planes which are at right angles to each other, and therefore it will be clear that the carriage 7 is capable of an independent vibration around its pivotal point in a plane at right angles to that in which the head 4 swings.

The arm 10 is perfectly rigid with the brackets 6, and when the carriage swings on its pivotal point it will do so with a resilient action, owing to the spring connection between said arm and the pouncing-arm.

Extending through the carriage 7 from the rear is a shaft 16, which carries a ball-pinion 17 at or about its middle portion, and a bevel-gear 18 on its inner extremity, which bevel-gear meshes with the bevel-gear 19, carried by an upright shaft 20, journaled in the carriage. On the lower extremity of this shaft 20 is a disk 21, provided with crank-pin 22, and 23 is a stud carried by the slide 9, to which pin and stud are swiveled the respective extremities of a rod 24, so that it will be readily understood that when the shaft 20 is revolved reciprocatory movements will be imparted to the slide 9.

The preceding description has reference solely to the mechanism for properly supporting the pouncing-pad and for imparting to the latter the proper reciprocatory movements, and it will be remembered that the carriage 7 is capable of an independent vibration within the head 4 in a plane at right angles to that in which said head is itself capable of swinging around the shaft 2. This independent vibration of the pouncing-arm is necessary for the proper adjustment of the latter in order that the pressure of the pouncing-pad against the hat-crown may be sufficient without being excessive, while at the same time said pad may be applied with a yielding pressure, which is of course very desirable. The swinging movements of the head 4 carry the pouncing-arm, and of course the pad from the base of the hat-crown to the tip, and vice versa, for the obvious purpose of enabling the pad to operate against the entire area of the hat-crown, and these movements I will now describe.

25 is a shaft journaled within suitable bearings supported by the bed and carrying at its outer end a bevel-pinion 26, and 27 is a collar loose around the outer extremity of this shaft.

28 is a bracket; 29, an ear extending from the bed and provided with an arcuate slot 30, and 31 is a bolt carried by the bracket and extending loosely within said slot.

32 is a shaft journaled within boxes 33, carried by said bracket, and having on its lower extremity bevel-pinion 34, which meshes with the pinion 26, said shaft also carrying a worm 35, which meshes with the segment worm-gear 5. The lower extremity of this shaft 32 extends loosely within the collar 27 and is supported thereby.

Extending from the upper end of the bracket 28 is a frame 36, whose upper portion is horizontally disposed and whose outer portion is vertical and is provided at its lower extremity with an inwardly-projecting toe 37.

38 is a coil-spring confined between the bed and the under side of the horizontal portion of the frame 36, the function of this spring being to normally sustain said frame, and consequently the bracket 28, in elevated position, so that the worm 35 and gear 34 will be in engagement with the segment-gear 5 and gear 26. It will thus be seen that this shaft 32 cannot be displaced lengthwise owing to the connection of the bracket 28 with the ear 29, but that the worm 35 may be separated from the segment-gear 5 by simply depressing the frame 36 against the resiliency of the spring 38.

Referring particularly to Figs. 2 and 6, 39 is a rock-shaft journaled in any suitable stationary part of the machine, preferably a pair of the legs 40, and secured upon this shaft is an ordinary treadle 41. 42 is a crank-arm secured to this shaft 39, and 43 is a lever pivoted at 44 to the bed and having at its upper extremity a beak 45, which extends laterally immediately above the toe 37 of the frame 36. This lever 43 and crank-arm 42 are connected by means of a rod 46, whose extremities are pivoted, respectively, to said lever and frame, so that it will be clear that when the treadle is depressed the beak 45 will pull the frame downward, thereby separating the worm 35 from the segment-gear 5.

When the worm 35 is operated to swing the head 4 around, so that the pouncing-pad is operating against the tip of the hat, as shown at Figs. 3 and 8, the power will be disconnected from the machine by automatically operated and controlled appliances presently to be described, and the operator then depresses the treadle, and, grasping the extremity of the pouncing-arm 8, swings the head 4 and the parts carried thereby back to their normal or elevated position, such as is shown at Figs. 1 and 6. A counterpoise 47 is suspended from the head 4 by means of a sprocket-chain 48, which latter passes over a sprocket-wheel 49, journaled to the bed, in order to steady the swinging movements of the head and to assist in returning said head and the parts carried thereby to their normally-elevated position.

50 is a shaft journaled within suitable bearings supported by the bed and carrying near its outer extremity a spur gear-wheel 51, which meshes with a pinion 52 on the shaft 2, and on this last-named shaft is mounted a gear-wheel 53, which meshes with the ball-pinion 17. The shafts 50 25 carry intermeshing gears 54 55, whereby rotary motion is communicated to the shaft 25.

Of course there are many ways in which gears, pinions, and other well-known mechanical appliances may be utilized in bringing about the proper movements of the head 4, all of which in their application involve most ordinary mechanical skill, and I do not, therefore, wish to be limited thereby, the feature of my improvement in this respect consisting of the rotary worm engaged with the segmental gear on the head.

Attention is next called to the means which I employ for properly supporting and clamping the hat, and for revolving the latter beneath the pouncing-pad, and in this connection I would say that I use the ordinary oval lathe, which keeps the hat always up to the pouncing-pad. It is not deemed necessary to illustrate this lathe or to enter into any description thereof, since the same is well known and forms no part of my invention, and I have therefore shown and will refer in my description merely to the shaft of the lathe, to which the hat-block with the hat in position thereon is secured.

Referring to Figs. 2, 3, 4, and 5, 56 is the primary shaft of the oval lathe, having secured thereon gear-wheel 57, and 58 is a shaft journaled in bearings supported by the bed and carrying at its outer extremity a gear 59, connected with the gear 57 by means of the idle-gear 60, carried by the short shaft 61, journaled in bearings supported by the bed. On the inner extremity of the shaft 58 is a bevel-gear 62, which meshes with bevel-pinion 63 on the inner extremity of the shaft 50.

From the foregoing it will be evident that the oval lathe receives its rotary motion from the shaft 50 through the medium of the several gears 63, 62, 59, 60, and 57.

64 is the secondary shaft of the oval lathe, or, in other words, the shaft to which the hat-block is attached, and this shaft has at its extremity a disk or head 65, from the center of which projects a square stud 66.

67 is a metal plate curved and shaped to conform to the general shape and droop of a hat-brim, which plate is permanently secured to the disk 65 in any suitable manner. Hinged to one end of the plate 67 is a clamping-ring 68, whose opening is large enough to permit said ring to swing over the crown of a hat, and this ring is provided at its free extremity with any suitable catch 69, which, when the ring is closed, is engaged by a lock-lever 70, so as to secure the ring in closed position. 71 is the hat-block of any ordinary and approved shape and having at its center a square opening 72, within which the stud 66 can fit snugly.

In securing a hat A in position at the end of the shaft 64, it is first placed upon a suitable block, and the latter is then mounted on the stud 66. A metal ring 73, closely conforming to the base of the crown, is then placed over the latter, so as to rest against the brim, and the clamping-ring 68 is finally swung into position and locked firmly against this ring 73. This manner of applying the hat-block to the secondary shaft of the oval lathe is clearly illustrated at Figs. 12 and 13 of the drawings, and in this connection I would say that the ring 73 forms a firm and unyielding collar at the base of the crown, against which collar the clamping-ring 68 binds so firmly that there can be no shaking or wabbling of the block 71. Furthermore, these conform-rings 73 preserve the sharp angular band-line which marks the junction of the brim with the crown, and also prevent any damage to the brim either from the operation of the crown-pouncing devices or from other accidental sources.

It is a fact that any suitable pouncing-pad may be secured to the slide 9 and operated to good advantage by my improved machine, as heretofore described; but I prefer to use the pad and sandpaper arrangement shown in the drawings, since I have found this construction to be infinitely superior to anything in this line that I have ever seen. As a preface to the description of this pad I would say that all crown-pouncing pads should be made of some material flexible in its nature, so that it can twist and conform itself readily to the shape or outline against which it presses; and the pad should also be influenced by some resilient agent, so that the flexibility shall not be lifeless or dead; and also there should be a firm pressure exerted upon the pad from above, so as to keep it snugly and firmly up to its work; but this pressure should not interfere with either the flexibility or resiliency of the pad and it should not have a tendency to make one portion of the pad bite into the hat, so as to scarf the same. Bearing these points in mind and calling particular attention to Figs. 1, 5, 14, 15, and 16 of the drawings, I will now describe the construction of my improved pad in connection with the particular sandpapering appliance used.

74 is a bow which is secured to the under side of the slide 9 and whose ends are horizontally disposed, so as to afford ledges 75, on which ledges are secured boxes 76, within which are thumb-nuts 77.

78 are yokes which completely surround said boxes and ledges, and between the bottoms of the yokes and said ledges are metal plates 79 80, and intermediate of these plates are the ends of a flexible strap 81, which plates and ends are firmly secured to the ledges 75 by screws 82, driven from the plates 80 up through said ends and plates 79 into the ledges 75. Superimposed upon the strap 81 and in successive layers are flexible resilient strips 83, 84, and 85, which are of decreasing lengths and widths; that is to say, the longest and widest of these strips is at the bottom and rests immediately upon the strap 81, while the shortest and narrowest of said strips is at the top.

86 is a heavy wire whose extremities are soldered or otherwise secured to the plates 79 and which bears firmly against the uppermost strip 85.

87 is the pouncing-pad proper, which is preferably made from soft yielding felt and is secured to the bottom of the strap 81.

Secured to the inner ledge 75 is a hollow drum 88, through which latter extends a post 89, and around this post is placed the sandpaper 90 in the form of a coil. The free end of the coil of sandpaper is drawn from the drum between the adjacent plate 80 and the bottom of the yoke 78 and thence beneath the pad 87 between the remote plate 80 and the bottom of its corresponding yoke 78.

91 are screws rigid with the upper portion of the yokes 78, so as to be incapable of rotation, said screws depending loosely through the boxes 76 and taking with their threads into the thumb-nuts 77. When the sandpaper has been drawn to the proper tension across the bottom face of the pad 87, these thumb-nuts 77 are operated to bind the paper firmly between the bottoms of the yokes 78 and the plates 80, thus holding said paper in position as against slipping. When it becomes necessary to use a fresh section of sandpaper, the nuts 77 are operated to loosen the yokes, whereupon the paper is drawn through the latter across the face of the pad until the new section of paper is in proper position, and then the nuts are operated to clamp the paper after the latter has been brought to the proper tension.

The sandpaper drum moves to and fro in harmony with the reciprocatory pad, and if the sandpaper were allowed to remain in a loose coil in the drum, these reciprocatory movements would speedily cause the sand to become worn or shaken off from the paper. I have therefore provided means for holding the coils of the paper firmly together, so that they do not rub against each other and are not affected by the shaking of the drum. These means are very simple and comprise merely a pair of arms 92 93, which overlap each other horizontally across one side of the sandpaper roll and are provided with elongated slots 94 95, through which passes the post 89. The upper end of this post is threaded and is provided with a thumb-nut 96, while a shoulder 97 around said post extends immediately below the lowermost arm 92, so that it will be clear that when these arms are contracted or diverged they may be secured firmly in any position by the operation of this nut 96. Depending from the outer extremities of these arms are clamps 98 99, curved to conform to the general shape of the sandpaper coil and fitting firmly against opposite sides of the latter. In order to draw a fresh section of sandpaper, the nut 96 is operated to release the clamps, whereby the paper may be drawn freely from the coil, but after a new section of paper has been adjusted and fastened across the face of the pad 87 said clamps are brought firmly against the roll of paper and the nut is operated to secure them, thus holding the coils of the sandpaper roll as well as the roll itself firmly as against any independent shaking during the to-and-fro movements of the pouncing-pad.

Now again referring to the construction of the pouncing-pad, it will be noted that the flexibility of the pad proper is not impeded by any stiff or unyielding substance, as a broad or solid backing, above the pad. The wire 86 extends across the middle of the pad from end to end, and is therefore located in coincidence with the axis of the pad, so that it will be clear that said wire, while it holds the pad firmly in position, does not interfere in the slightest degree with its flexibility. The strap 81 and the strips 83, 84, and 85 can be made from rubber, webbing, or in fact from any flexible resilient material, and the relative dimensions of these strips, as hereinbefore set forth, afford a backing to the pad of gradually-decreasing thickness from the axis of the pad toward the sides, which feature is exceedingly valuable in that the pad meets with the least resistance at the points where it should have its great flexibility. The several layers of these strips cause the wire to be so far removed from the pad itself that the efficiency of the latter is not impaired, whereas if such wire, or in fact any hard substance, were backed in contact against the top of the pad, the hats would be seared and marked immediately below such wire or substance. Again, if the strips were all as wide as the bottom strip 83, the flexibility of the pad would be seriously impaired, and if such strips were all as narrow as the strip 85, there would be no life or resiliency to the flexibility of the pad. I therefore consider that the specific construction of pad which I have shown and described is exceedingly valuable for use in machines for pouncing hat-crowns, although I do not wish to be limited in this connection to any particular means shown and described for supplying the sandpaper or securing the same in position.

When the pouncing-pad is operating upon the sides of a hat-crown, the weight of the arm 8 and the parts carried thereby causes the pad to bear with sufficient pressure against the hat, which weight is, as has before been stated, modified by the adjustment of the spring 11, but when the pad is carried around the curve of the hat-crown toward the tip of the latter the pressure against the hat decreases until at the extreme tip it amounts to nothing. It therefore becomes necessary to provide means for causing the pad to exert a sufficient pressure against the hat while leaving the straight sides and traveling toward the tip, and I will now describe the means which I employ for effecting this result.

Secured to the side of the bed at a point substantially opposite to the oval lathe is a bracket 100, within which is secured a post 101, and loose around this post is a collar 102. 103 is a hub secured to the extremity of the post 101 close to the collar 102, so that it will be understood that said collar, while capable of a lateral movement, is confined between the end of the bracket and this hub. The hub is formed with a socket 104, which registers with a notch 105 in the side of the collar 102, when the latter is revolved so as to bring said notch in position. Within the socket 104 is a bolt 106, from which extends a spindle 107 out through the hub, said spindle being provided with a knob 108.

109 is a coil-spring around said spindle within the socket 104 and confined as to its extremities by the bolt 106 and the wall of the socket.

110 is a frame which is provided with two dowels 111 112, which pass freely through the upper portion of the collar and an extension 113 from the bottom of said collar.

114 is a screw carried by the frame 110 and capable of rotation, but confined as against lengthwise movement and provided with a crank 115 for turning the same. This screw engages a threaded opening in the extension 113, and when the crank 115 is turned the frame 110 will approach or recede from the collar 102. Secured to the upper portion of the frame 110 is a leaf-spring 116 of any preferred construction, which normally extends substantially opposite to the tip of the hat, as seen at Figs. 8 and 9. This spring is adjusted by means of the screw 114, so as to normally be at such a distance from the hat that when the pad is swung around toward the tip the arm 8 will be carried against said spring, so as to keep the pad pressed firmly against the tip of the hat. In order to better equip this spring for performing its function, I have so curved and shaped it that when the pouncing-arm is against it the pressure of the pad throughout the curved area of the tip will be uniform. When it becomes necessary to throw this spring out of the way, the bolt 106 is withdrawn from the notch 105, and the collar 102 revolved to throw the spring backward.

While the operator may by shifting the belt stop the machine when the pouncing-pad has been carried around to the tip of the hat, I prefer that this shall be done by automatically-controlled and operated appliances; but I do not wish to be limited to the use of such appliances for two reasons, first, because the means which I show herein for automatically effecting and controlling the stopping of the machine are identical in construction and operation with the corresponding means which are shown, described, and claimed in the application now pending in the United States Patent Office and filed by me August 22, 1895, under Serial No. 560,080, and, second, because my present invention is complete without any such appliances. However, for a better understanding of the construction which I have shown, and in order that no confusion may arise as to the indentity and function of the elements which are parts of such appliances, I will briefly refer to the latter and state their functions without going into details.

117 is a belt-pulley loose on the shaft 2, and 118 is an ordinary friction-clutch splined on said shaft and adapted to engage the pulley.

119 is a clutch-lever pivoted at 120 to the bed and having its inner extremity connected in the ordinary manner to the friction-clutch.

121 is a coil-spring, one end of which is connected to the outer end of the clutch-lever while the other extremity is secured to the bed, the function of said spring being to keep the friction-clutch in engagement with the belt-pulley.

122 is a rack-bar which is round in cross-section and is supported in bearings 123, secured to the bed in such manner as to be capable of both a sliding and a rotary movement.

124 is a rock-lever pivoted at 125 to the bed, the inner end of said lever being kept firmly pressed against the face-cam 126 on the shaft 50 by means of a coil-spring 127, the extremities of which latter are connected, respectively, to the bed and to the outer end of said rock-lever.

128 is a spring-actuated pawl, which is seated within the outer end of the rock-lever 124 in such manner as to be capable of a slight rotary movement, and the teeth of said pawl are adapted to engage with the teeth on the top of the rack-bar 122.

129 is a spring-actuated detent-pawl seated within any stationary part of the machine, in the present instance in one of the bearing-blocks 123, which pawl is adapted to engage with the teeth on the under side of the rack-bar.

130 is a notched gravity-pawl pivoted at 131 to the bed and having a beveled nose 132, which pawl overhangs the end of the clutch-lever 119, and is adapted to hold the friction-clutch out of engagement with the belt-pulley when said lever has been drawn into the notched portion of the pawl.

133 is a conical-shaped trip-cam on the rack-bar 122, which, when said rack-bar is drawn forward by the operator, strikes against the beveled nose 132 of the gravity-pawl 130 and raises the latter out of engagement with the clutch-lever 119, thereby permitting the friction-clutch to engage the belt-pulley, so that the machine may operate.

134 is a pin which extends from the upper side of the rack-bar, which pin is so located that, when the machine shall have been operated to fully pounce a hat-crown, said pin will be carried against the clutch-lever to disengage the machine from the motive power.

135 is a handle on the forward end of the rack-bar, and 136 is a counterpoise for said handle at the other end of the rack-bar.

When it is desired to start the machine in order to pounce a hat-crown, the operator grasps the handle 135 and rotates the rack-bar until the pawls are removed from the teeth on said bar and rest upon the smooth surface of the latter. The rack-bar is then drawn forward until the trip-cam 133 strikes the beveled nose of the pawl 130 and raises the latter to release the clutch-lever and cause the friction-clutch to engage the belt-pulley. The rack-bar is then turned to its normal position and no further attention to the machine in this respect is now required.

It is unnecessary, perhaps, to remark that the relative speeding of the various parts of my improved machine is such that all of the elements thereof will operate in harmony to perform their functions effectively and at the proper times, and I do not believe that any detailed explanation as to the various measurements or relative sizes of gears, pinions, and other parts is necessary.

Having thus described my invention, what I claim as new, and desire to secure by Letters Patent, is—

1. In a machine for pouncing the crowns of hats, the combination of the pivoted head whose upper portion carries the pouncing-arm while the lower portion is extended below the pivotal point and is formed into a segment-gear, the worm in engagement with said gear, the oval lathe and the hat-block carried thereby, and operative connections between said parts for revolving said worm and oval lathe, substantially as set forth.

2. In a machine for pouncing the crowns of hats, the combination of the oval lathe and the hat-block carried thereby, the pivoted head having segment-gear formed thereon, the carriage pivoted to said head and capable of vibration in a plane at right angles to the plane in which said head swings, the pouncing-arm extending from said carriage and having ways formed therein, the slide within said ways, the pouncing-pad carried by said slide, and operative connections for reciprocating said slide, for swinging said head and for revolving said lathe, substantially as set forth.

3. In a machine for pouncing the crowns of hats, the combination of the oval lathe and the hat-block carried thereby, the pivoted head, the carriage pivoted to said head and capable of vibration in a plane at right angles to the plane in which said head swings, the pouncing-arm extending from said carriage, the reciprocatory pouncing-pad carried by said carriage, the resilient keeper beyond the hat-block and within the field of travel of the pouncing-arm, and means for reciprocating said slide, for swinging said head and for revolving said lathe, substantially as set forth.

4. The combination of the pivoted head having the pouncing-arm and provided with teeth, the swinging bracket, the worm journaled in said bracket and normally engaging said teeth, and means for swinging said bracket to and fro whereby the worm is engaged with or disengaged from said teeth, substantially as set forth.

5. The combination of the power-shaft carrying a large gear and a pinion, the head pivoted around said shaft and having a segment-gear formed in its bottom portion, the worm in engagement with said teeth, the carriage pivoted within said head and having extending therefrom the pouncing-arm, the horizontal shaft journaled within said carriage and carrying a ball-pinion in engagement with the large gear on the power-shaft, the reciprocatory slide within suitable ways in said pouncing-arm, the pouncing-pad carried by said slide, the vertically-disposed shaft journaled within said carriage, connections between the two shafts in said carriage whereby rotary motion is imparted to said vertical shaft, the disk carried by the latter and having crank-pin extending therefrom, connections between said disk and slide whereby the rotation of the disk will impart reciprocatory movements to the slide, the oval lathe and the hat-block carried thereby, the resilient keeper secured to the bed of the machine beyond the hat-block and within the field of travel of the pouncing-arm, and operative connections between the power-shaft and worm and between the power-shaft and lathe, whereby the head is swung around and the lathe revolved, substantially as set forth.

6. The combination of the oval lathe carrying the hat-block, the swinging pouncing-arm carrying the pouncing-pad, and the resilient keeper secured to the bed of the machine beyond the tip of the hat-block and within the field of travel of said arm, substantially as set forth.

7. The pouncing-pad comprising the bow, the flexible strap secured to the extremities of said bow, the flexible pouncing-pad secured to the bottom of said strap, the successive layers of decreasing lengths and widths superimposed upon said strap, and the wire secured on top of the uppermost layer in the axial plane of said pad, substantially as set forth.

8. The pouncing-pad comprising the bow, the flexible strap secured to the extremities of said bow, the flexible pouncing-pad secured to the bottom of said strap, the successive layers of decreasing lengths and widths superimposed upon said strap, the wire secured on top of the uppermost layer in the axial plane of said pad, and the sandpaper-clamping yokes secured to said bow at the extremities thereof, substantially as set forth.

9. The pouncing-pad comprising the bow, the flexible strap secured to the extremities of said bow, the flexible pouncing-pad secured to the bottom of said strap, the successive layers of decreasing lengths and widths superimposed upon said strap, the wire secured on top of the uppermost layer in the axial plane of said pad, the boxes secured upon the extremities of said bow, the yokes surrounding said boxes and bow, the thumb-nuts confined within said boxes except as to rotation, and the screws engaged by said nuts and depending from the tops of said yokes freely through the roofs of the boxes, substantially as set forth.

10. The combination of the pouncing-pad carrying at each end sandpaper-clamping yokes and means for positively binding said yokes against the sandpaper whereby the latter is firmly held, with the drum secured near one extremity of the pad and containing a roll of sandpaper capable of being led out through said yokes and beneath the pad, and means carried by said drum for clamping the sandpaper roll as against vibration, substantially as set forth.

11. The drum having a central post extending therethrough from side to side and threaded at one extremity and provided with a collar at a short distance from said thread, the roll of sandpaper around said post, the arms provided with clamps which laterally embrace the sandpaper roll and having also elongated slots which coincide and through which the threaded extremity of said post projects, and the thumb-nut on the threaded portion of the post whereby said arms are firmly clamped between said nut and collar, substantially as set forth.

12. The herein-described means for clamping a blocked hat to the shaft of a hat-lathe, the same comprising a base-plate secured to said shaft, a clamping-ring hinged to said plate, and a separate ring which conforms to the base of the hat-crown, which ring, when the hat and block are clamped in position, is interposed between the hat-brim and the clamping-ring, whereby the hat is firmly clamped at the point where the crown meets the brim, substantially as set forth.

In testimony whereof I affix my signature in presence of two witnesses.

GEORGE E. BRUSH.

Witnesses:
ALEX. I. GORDON,
DUPUYTREN V. HAIGHT.